United States Patent
Weeber et al.

(10) Patent No.: US 7,466,046 B2
(45) Date of Patent: Dec. 16, 2008

(54) METHODS AND APPARATUS FOR OPERATING AN ELECTRIC MACHINE

(75) Inventors: Konrad Roman Weeber, Rexford, NY (US); Kiruba Sivasubramaniam, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 85 days.

(21) Appl. No.: 11/428,633

(22) Filed: Jul. 5, 2006

(65) Prior Publication Data

US 2008/0007132 A1 Jan. 10, 2008

(51) Int. Cl.
*H02K 9/00* (2006.01)
(52) U.S. Cl. .......................... 310/52; 310/54
(58) Field of Classification Search ................... 310/52, 310/54, 178, 261, 57–59
See application file for complete search history.

(56) References Cited

U.S. PATENT DOCUMENTS

| | | | | |
|---|---|---|---|---|
| 3,821,568 A | * | 6/1974 | Gillet | 310/54 |
| 4,013,908 A | * | 3/1977 | Weghaupt | 310/61 |
| 4,396,847 A | * | 8/1983 | Weghaupt et al. | 310/52 |
| 4,745,313 A | * | 5/1988 | Brunet et al. | 310/52 |
| 4,808,864 A | * | 2/1989 | Brunet et al. | 310/52 |
| 4,816,708 A | * | 3/1989 | Laumond | 310/52 |
| 5,018,357 A | | 5/1991 | Livingstone et al. | |
| 6,326,713 B1 | * | 12/2001 | Judson | 310/112 |
| 6,354,087 B1 | | 3/2002 | Nakahara et al. | |
| 6,438,969 B1 | | 8/2002 | Laskaris et al. | |
| 6,442,949 B1 | | 9/2002 | Laskaris et al. | |
| 6,553,773 B2 | | 4/2003 | Laskaris | |
| 6,679,066 B1 | | 1/2004 | Funayama et al. | |
| 6,700,297 B2 | * | 3/2004 | Hsu et al. | 310/266 |
| 6,725,683 B1 | | 4/2004 | Laskaris | |
| 6,815,860 B2 | * | 11/2004 | Wang et al. | 310/214 |
| 6,885,124 B2 | * | 4/2005 | Neet | 310/208 |
| 7,003,977 B2 | | 2/2006 | Steinbach et al. | |
| 7,019,429 B1 | * | 3/2006 | Larsson et al. | 310/215 |
| 2003/0173862 A1 | * | 9/2003 | Wang et al. | 310/261 |
| 2004/0056541 A1 | | 3/2004 | Steinmeyer | |

* cited by examiner

*Primary Examiner*—Thanh Lam
(74) *Attorney, Agent, or Firm*—Penny A. Clarke

(57) ABSTRACT

A method of operating a high speed machine, wherein the method includes providing at least one heteropolar generator that includes a stator, a rotor, and at least one stationary superconducting field coil therein. The method also includes coupling at least one cryogenic refrigeration system to the at least one stationary superconducting field coil, wherein the at least one cryogenic refrigeration system is coupled in flow communication with only the at least one stationary superconducting field coils to facilitate reducing an operating temperature of the at least one stationary superconducting field coil.

14 Claims, 3 Drawing Sheets

METHODS AND APPARATUS FOR OPERATING AN ELECTRIC MACHINE

BACKGROUND OF THE INVENTION

This invention relates generally to electric machines, and more particularly, to methods and apparatus for operating an electric machine.

At least some known high speed machines, such as a Lundell generator, benefit from eliminating active electrical components, such as field coils, from the rotor. More specifically, removing such components may improve the reliability of, and provide for, a more robust rotor design that does not require a mechanical support structure for such components. These machines have stationary field coils, and are generally fabricated from conventional conductors, such as, for example, copper or aluminum. Additionally, these stationary field coils are cooled by the same cooling medium as the rest of the machine.

It is well known that high speed machines, such as, for example generators or motors, generate heat that must be dissipated. To disseminate the heat, at least some known generators are equipped with cooling systems, such as, for example air, gas, and/or liquid ventilation systems. Typically, such ventilation systems cool both the stator and the rotor. It may be difficult to optimize the cooling of a generator that includes a stator, a rotor, with a ventilation system that provides cooling for both a rotor and a stator that are thermally coupled. However, the addition of a separate and independent cryogenic cooling system for cooling a stationary superconducting field coil would facilitate optimizing the cooling of the generator since it thermally decouples the field coil from the rest of the machine.

BRIEF DESCRIPTION OF THE INVENTION

In one aspect, a method of operating a high speed machine is provided. The method includes providing at least one heteropolar generator that includes a stator, a rotor, and at least one stationary superconducting field coil therein. The method also includes coupling at least one cryogenic refrigeration system to the at least one stationary superconducting field coil, wherein the at least one cryogenic refrigeration system is coupled in flow communication with only the at least one stationary superconducting field coils to facilitate reducing an operating temperature of the at least one stationary superconducting field coil.

In another aspect, a high speed machine is provided. The machine includes at least one heteropolar generator including at least one of a stator, a rotor, and at least one stationary superconducting field coil therein. The machine also includes at least one cryogenic refrigeration system in flow communication with the at least one stationary superconducting field coil to facilitate reducing an operating temperature of the at least one stationary superconducting field coil.

In a further embodiment, a power generation system is provided. The system includes at least one prime mover and at least one heteropolar generator rotatably coupled to the at least one prime mover, wherein the at least one generator includes a stator, a rotor, and at least one stationary superconducting field coil therein. The system also includes at least one cryogenic refrigeration system coupled in flow communication with only the at least one stationary superconducting field coil to facilitate reducing an operating temperature of the at least one stationary superconducting field coil.

DETAILED DESCRIPTION OF THE INVENTION

Figure 1:
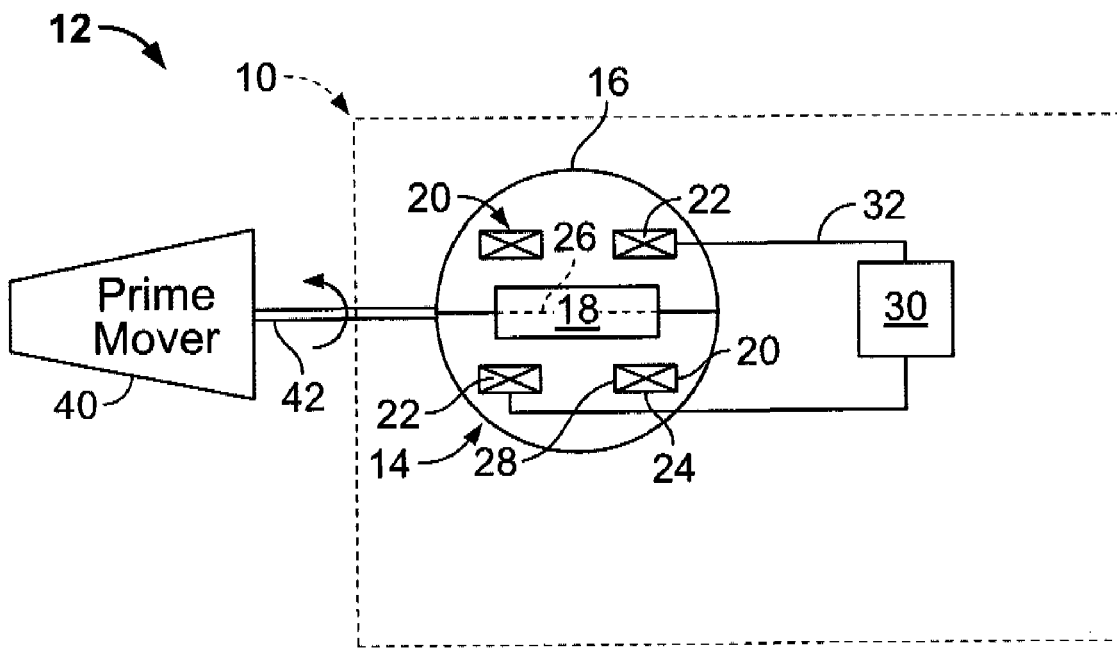
FIG. 1 is a schematic diagram of an exemplary superconducting generator system coupled to an exemplary power plant.
Figure 2:
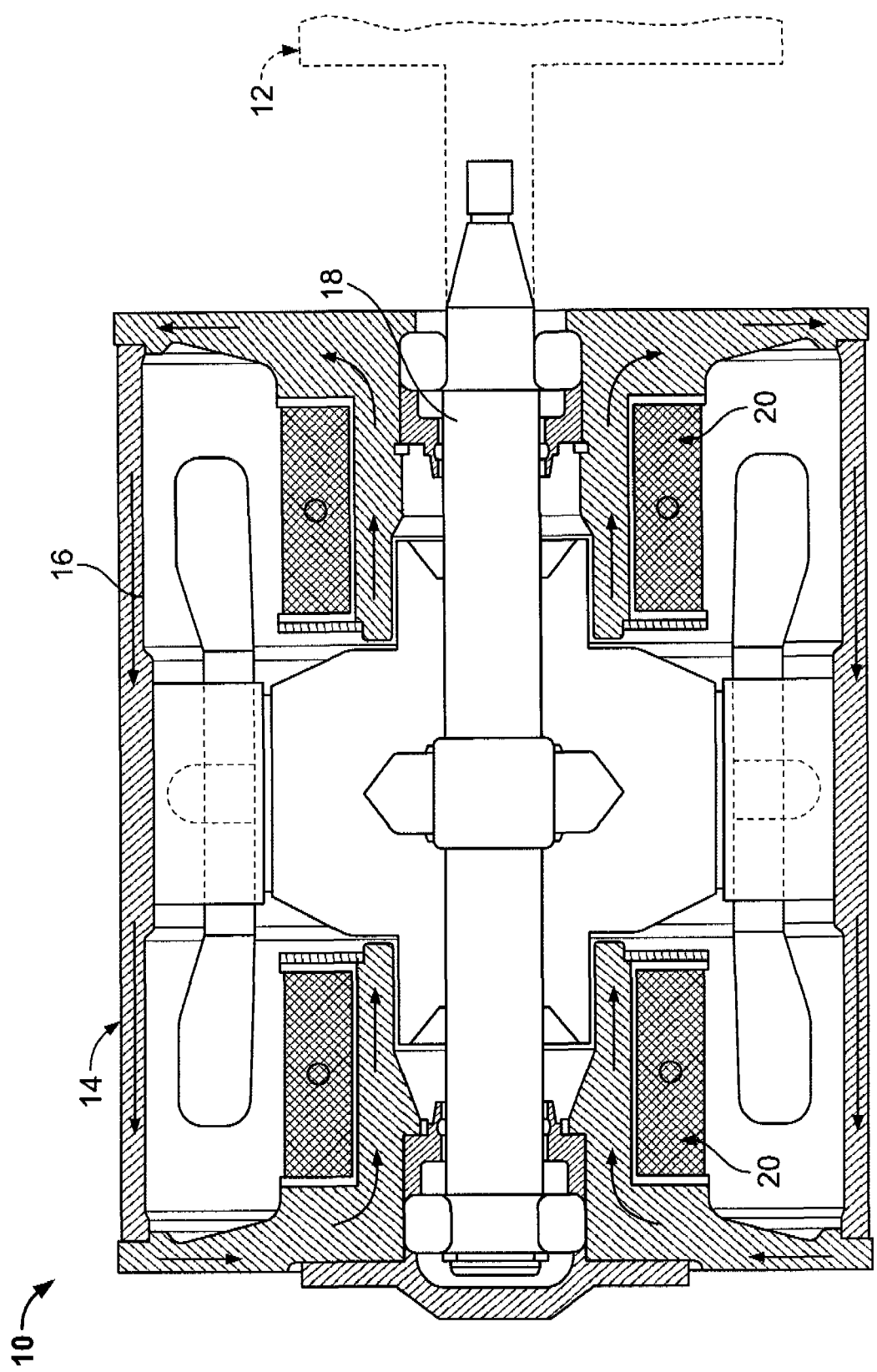
FIG. 2 is an enlarged cross-sectional view of an exemplary superconducting alternator that may be used with the generator system shown in FIG. 1.

FIG. 1 is a schematic diagram of an exemplary superconducting generator system 10 coupled to an exemplary power plant 12 configuration. In the exemplary embodiment, superconducting generator system 10 is a superconducting alternator 14 that includes at least one of a stator 16 and a rotor 18 that are coupled together such that rotor 18 is substantially co-axially aligned with respect to stator 16. FIG. 2 is an enlarged cross-sectional view of an exemplary superconducting alternator 14 that may be used with generator system 10. In the exemplary embodiment, superconducting alternator 14 is a heteropolar superconducting alternator and includes at least two stationary superconducting field coils 20.

In the exemplary embodiment, field coil 20 is a stationary high-temperature super-conducting (HTS) field coil 20 separate from rotor 18. Separating HTS field coil 20 from rotor 18 permits the use of smaller size HTS field coils 20 and enables a higher ampere turn capability of HTS field coil 20, thereby resulting in higher engineering current densities and increases in the rating capability of alternator 14. HTS field coil 20 includes a plurality of HTS wires 22 wherein at least one HTS wire is a high temperature super-conducting conductor wire 22, such as, for example, but not limited to a BSCCO 2223 ($Bi_2Sr_2Ca_2Cu_3O_{10}$) conductor wire laminated with a solid epoxy impregnated winding composite. For example, a series of BSCCO 2223 wires may be laminated, bonded together and wound into a solid epoxy impregnated coil. In another embodiment, each HTS field coil 20 is fabricated from at least one of YBCO ($YBa_2Cu_3O_7$) or MgB2. In alternative embodiments, each HTS field coil 20 is fabricated from any suitable material that enables alternator 14 to function as described herein.

Each HTS field coil 20 may be formed with a race-track shape, a cylindrical shape, or any other shape that is suitable for a particular rotor design. More specifically, although the dimensions of HTS field coil 20 are dependent on the dimensions of rotor 18, the removal of the field coils from rotor 18 facilitates a robust rotor design. Furthermore, the robust rotor design allows for a smaller bearing (not shown) span and a smaller and lighter stator 16. In the exemplary embodiment, each HTS field coil 20 is wound around the centerline of the rotor 18. Generally, each HTS field coil 20 circumscribes the rotor. The HTS field coil 20 define a substantially resistance free electrical flow path around rotor 18 and between the magnetic poles of rotor 18 and thereby improve efficiency by facilitating the elimination of field $I^2R$ losses.

Each HTS field coil 20 is coupled to a known cryogenic refrigeration system 30 though supply and return lines 32 that enable cryogenic liquid or gas to be supplied to HTS field coil 20, and channel spent cryogenic liquid or gas from HTS field coil 20. Typically, known cryogenic refrigeration system 30 requires a cryogenic transfer coupling, but however, because HTS field coil 20 is stationary, in the exemplary embodiment, no cryogenic transfer coupling is required. More specifically, refrigeration system 30 receives a cryogenic fluid in a liquid form or in a gas form from HTS field coil 20 and cools the cryogenic fluid such that the cryogenic fluid may be routed back to HTS field coil 20 for distribution within HTS field coil 20. In one embodiment, fluid passages (not shown) for cryogenic cooling fluid are defined in the HTS field coil 20. In another embodiment, cryogenic cooling passages are formed around an outside surface of HTS field coil 20.

In the exemplary embodiment, cryogenic refrigeration system 30 only cools HTS field coil 20.

In operation, cryogenic refrigeration system 30 supplies cryogenic fluid to superconducting HTS field coil 20. The cryogenic liquid or gas cooled by refrigeration system 30 is routed to HTS field coil 20 through lines 32. Cryogenic liquid or gas is then channeled through HTS field coil passages to cool HTS field coil 20. The spent cryogenic liquid or gas is then returned through lines 32 routed to refrigeration system 30 wherein heat removed from HTS field coil 20 is released to a heat sink (not shown). The cooling fluid facilitates maintaining the low temperatures, e.g., 27° K., in the HTS field coil 20 needed to promote superconducting conditions, including the absence of electrical resistance in the coil. In the exemplary embodiment, the high temperature superconductors have an operating temperature between a range of about 20° K. to about 70° K. In contrast, components that exhibit superconducting properties while operating in a range of about 2° K to about 5° K. are known as low-temperature superconductors.

Rotor 18 is rotatably coupled to a prime mover 40 through shaft 42. In one embodiment, prime mover 40 is a turbine assembly, such as but not limited to a gas turbine, a steam turbine, a hydro-turbine, and/or a wind turbine. In another embodiment, prime mover 40 is an internal combustion engine assembly. In the exemplary embodiment, power plant 12, is illustrated as having a single shaft power train wherein prime mover 40 is coupled substantially coaxially with rotor 18. In another embodiment, any portion of prime mover 40 may be coupled to rotor 18 via a power transmission device (not shown), such as, for example, a hydraulic coupling or a gear arrangement. Although prime mover 40 is illustrated and described herein as a single engine in the exemplary embodiment, it will be understood that prime mover 40 may be any suitable combination of engines capable of delivering rotary power to a shaft. For example, in combinations known as, but not limited to gas and steam turbines in simple cycle, combined cycle, tandem, cross compound, and dual-flow combinations.

Figure 3:
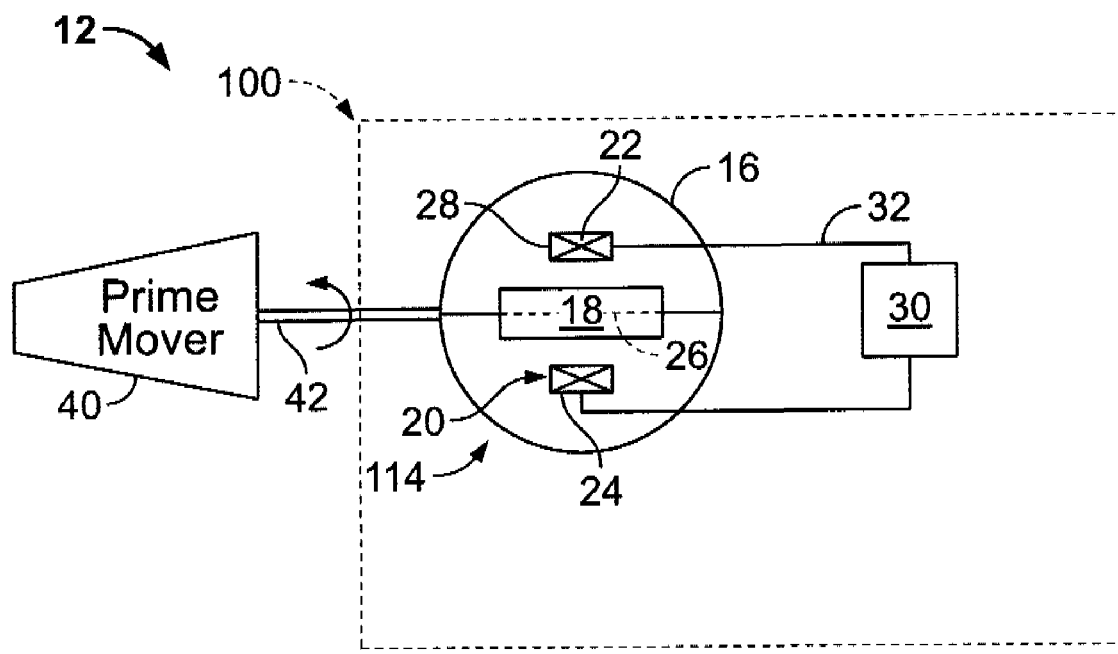
FIG. 3 is a schematic diagram of an alternative embodiment of a superconducting generator.
Figure 4:
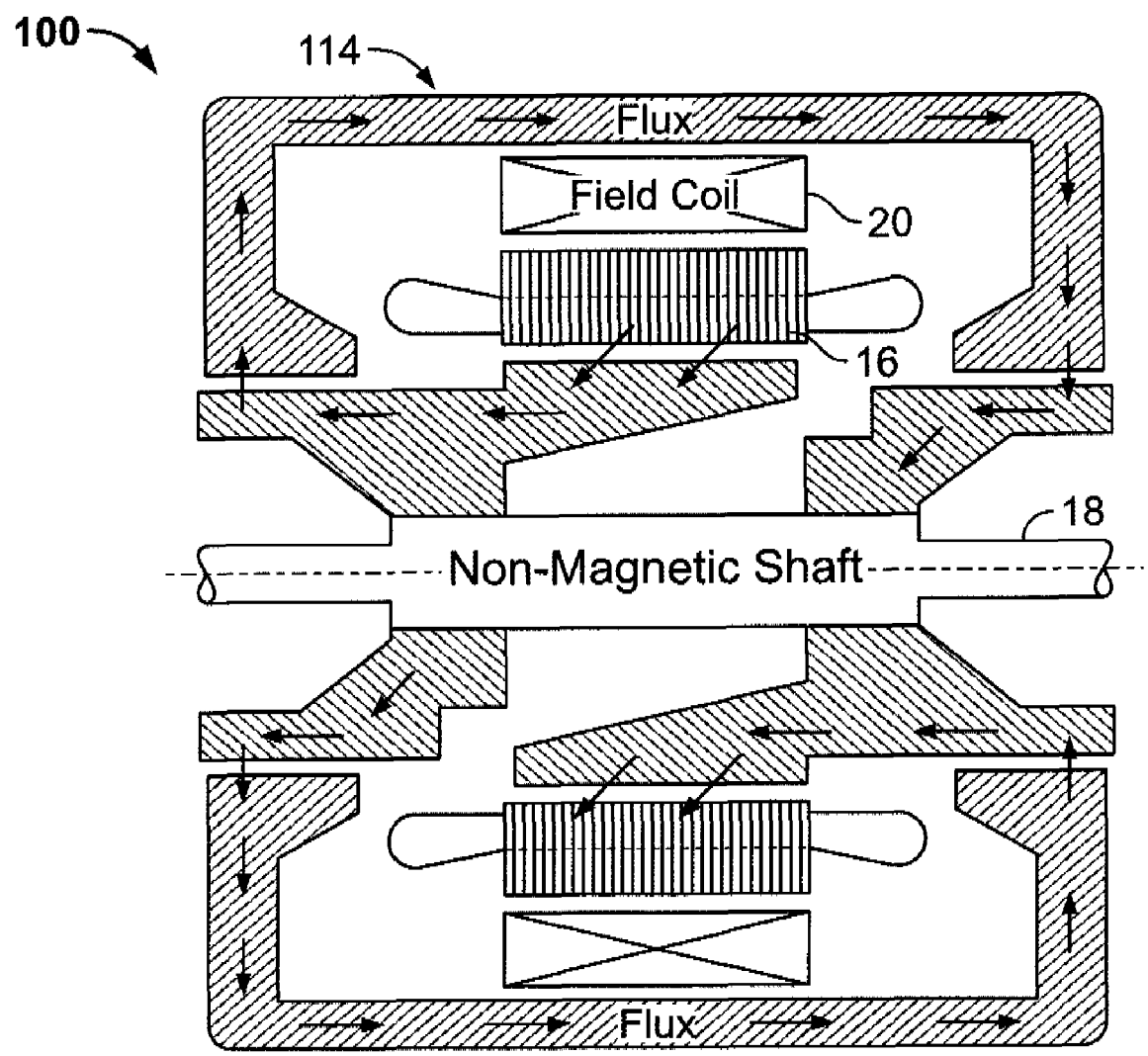
FIG. 4 is an enlarged cross-sectional view of an exemplary superconducting alternator that may be used with the generator system shown in FIG. 3.

In FIG. 3 is a schematic diagram of an alternative embodiment of a superconducting generator system 100. Superconducting generator system 100 is similar to superconducting generator system 10, (shown in FIG. 1) and components of superconducting generator system 100 that are identical to superconducting generator system 10 are identified in FIG. 3 using the same reference numbers used in FIG. 1. FIG. 4 is an enlarged cross-sectional view of an exemplary superconducting alternator 114 that may be used with the generator system shown in FIG. 3.

In the exemplary embodiment, superconducting generator system 100 is a superconducting alternator 114 that includes stator 16 and rotor 18 that are coupled together such that rotor 18 is substantially co-axially aligned with stator 16. In the exemplary embodiment, superconducting alternator 114 is a heteropolar superconducting alternator that includes at least one stationary superconducting field coil 20.

The above-described alternators are efficient, cost effective, and highly reliable. The heteropolar alternators include at least one stationary high-temperature superconducting field coil. The stationary nature of the high-temperature superconducting field coil allows for the elimination of a cryogenic transfer coupling. The removal of the field coils from the rotor improves efficiency by facilitating the elimination of field $I^2R$ losses, facilitates improving reliability, and provides for a robust rotor design. The removal also permits the use of a smaller size field coil which results in higher engineering current densities in the superconductor than in conventional conductors. Additionally, a smaller size field coil results in a smaller bearing span and a smaller and lower weight stator core and frame, therefore improving rotor dynamics. Finally, a higher ampere turn capability of the field coil increases the rating capability of the alternator thereby reducing the weight and volume of the alternator. The use of a single stationary high-temperature superconducting field coil further reduces the heat load, simplifies the mechanical supports, and further reduces the bearing span. As a result, the described alternators facilitates improving efficiency in a cost effective and reliable manner, Exemplary embodiments of heteropolar alternators with at least one stationary high-temperature superconducting field coil coupled to a separate and independent cryogenic refrigeration system are described above in detail. The alternators are not limited to the specific embodiments described herein, but rather, components of the alternators may be utilized independently and separately from other components described herein. Each alternator component can also be used in combination with other alternator components.

While the invention has been described in terms of various specific embodiments, those skilled in the art will recognize that the invention can be practiced with modification within the spirit and scope of the claims.

What is claimed is:

1. A method of operating a high speed machine, said method comprising:
   providing at least one heteropolar generator that includes a stator, a rotor, and at least one superconducting field coil therein, wherein each of the at least one superconducting field coils comprises a stationary superconducting field coil disposed on the stator; and
   coupling at least one cryogenic refrigeration system to the at least one stationary superconducting field coil, wherein the at least one cryogenic refrigeration system is coupled in flow communication with only the at least one stationary superconducting field coil to facilitate reducing an operating temperature of solely the at least one stationary superconducting field coil.

2. A method in accordance with claim 1 wherein providing at least one heteropolar generator further comprises providing at least one heteropolar generator that includes at least two stationary superconducting field coils therein.

3. A method in accordance with claim 1 further comprising:
   operating the heteropolar generator as a heteropolar alternator, wherein the alternator includes at least one stationary superconducting field coil therein; and
   coupling only the at least one stationary superconducting field coil in flow communication wit the at least one cryogenic refrigeration system.

4. A method in accordance with claim 1 wherein providing at least one heteropolar generator further comprises providing at least one heteropolar generator that includes at least one stationary high temperature superconducting field coil fabricated from material selected from at least one of a $Bi_2Sr_2Ca_2Cu_3O_{10}$, $YBa_2Cu_3O_7$, and a MgB2 material.

5. A method in accordance with claim 1 wherein coupling at least one cryogenic refrigeration system to the at least one stationary superconducting field coil further comprises channeling cryogenic cooling fluid to the at least one stationary superconducting field coil without the use of a cryogenic transfer coupling.

6. A high speed machine comprising:
   at least one heteropolar generator including at least one of a stator, a rotor, and at least one superconducting field coil therein, wherein each of the at least one superconducting field coils comprises a stationary superconducting field coil disposed on the stator; and
   at least one cryogenic refrigeration system in flow communication solely with said at least one stationary superconducting field coil to facilitate reducing an operating temperature of only said at least one stationary superconducting field coil.

7. A machine in accordance with claim 6 wherein said at least one heteropolar generator includes at least two stationary superconducting field coils therein.

8. A machine in accordance with claim 6 wherein said at least one heteropolar generator is a heteropolar alternator.

9. A machine in accordance with claim 6 wherein said at least one heteropolar generator further comprises at least one stationary high temperature superconducting field coil fabricated from at least one of a $Bi_2Sr_2Ca_2Cu_3O_{10}$, $YBa_2Cu_3O_7$, and MgB2 material.

10. A machine in accordance with claim 6 wherein said at least one cryogenic refrigeration system further comprises a cryogenic cooling fluid in flow communication with said at least one stationary superconducting field coil without the use of a cryogenic transfer coupling.

11. A power generation system comprising:
    at least one prime mover;
    at least one heteropolar generator rotatably coupled to said at least one prime mover, said at least one generator including a stator, a rotor, and at least one superconducting field coil therein, wherein each of the at least one superconducting field coils comprises a stationary superconducting field coil disposed on the stator; and
    at least one cryogenic refrigeration system coupled in flow communication solely with said at least one stationary superconducting field coil to facilitate reducing an operating temperature of only said at least one stationary superconducting field coil.

12. A system in accordance with claim 11 wherein said at least one heteropolar generator further comprises at least one cryogenic fluid supply line and at least one cryogenic fluid return line, each line coupled in flow communication with only said at least one stationary superconducting field coil.

13. A system in accordance with claim 11 wherein said heteropolar generator is a heteropolar alternator.

14. A system in accordance with claim 11 wherein said at least one heteropolar generator further comprises at least one stationary high temperature superconducting field coil fabricated from material selected from at least one of $Bi_2Sr_2Ca_2Cu_3O_{10}$, $YBa_2Cu_3O_7$, and MgB2 material.

* * * * *